Sept. 2, 1941.   W. H. MILLER   2,254,304
AILERON AND FLAP
Filed July 27, 1938    5 Sheets-Sheet 1
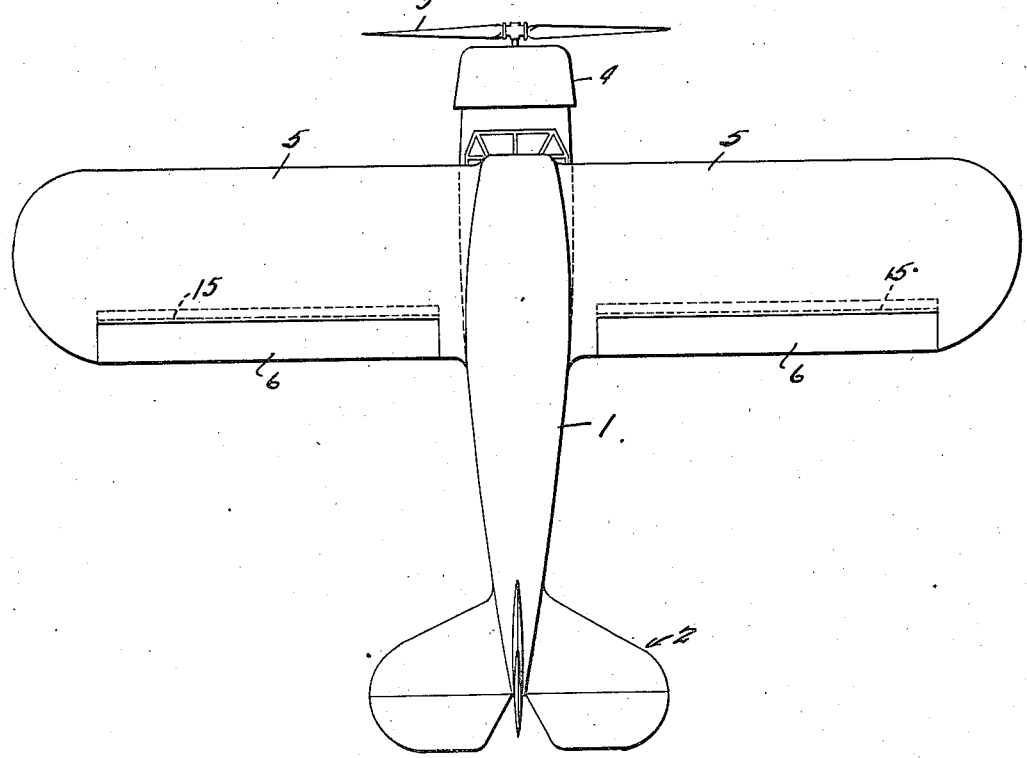
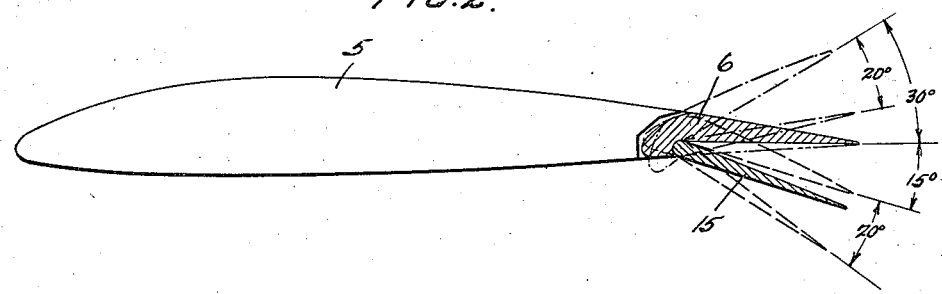
Inventor.
WILLIAM H MILLER
By Semmes, Keegin & Semmes
Attorneys Sept. 2, 1941.   W. H. MILLER   2,254,304
AILERON AND FLAP
Filed July 27, 1938   5 Sheets-Sheet 2
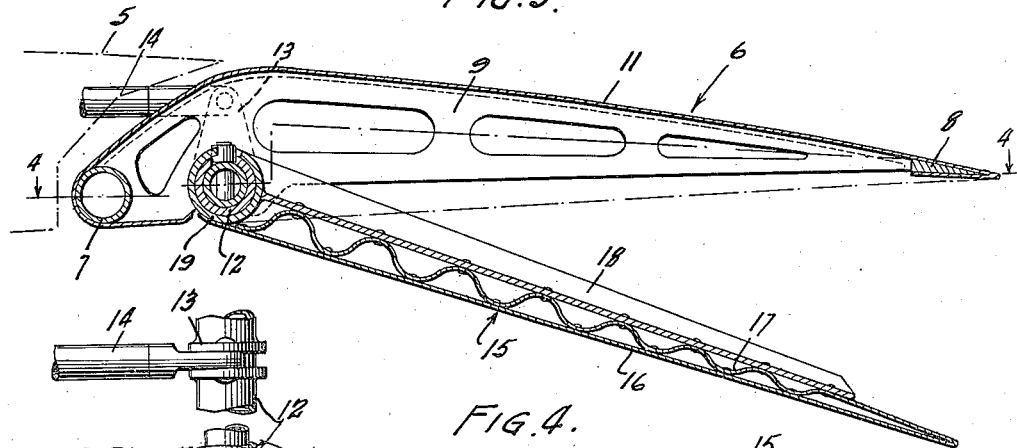
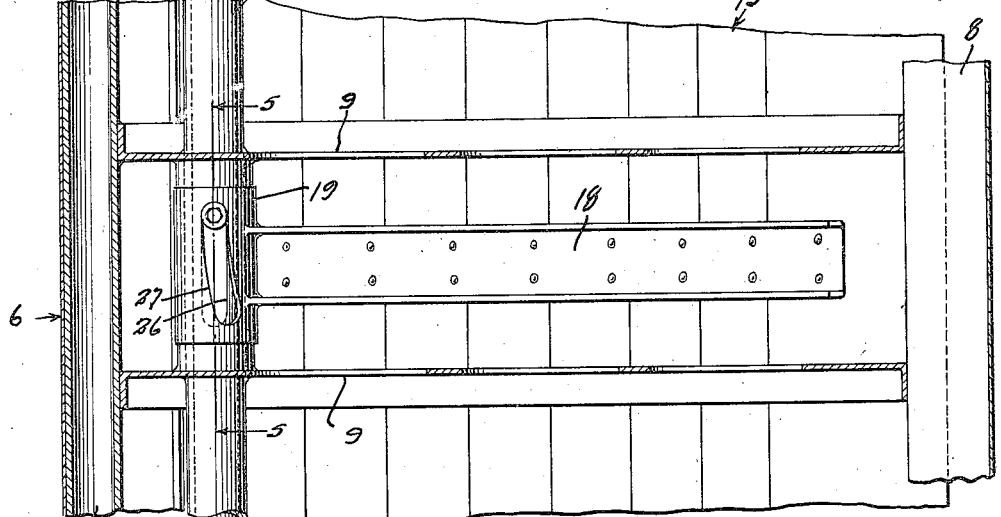
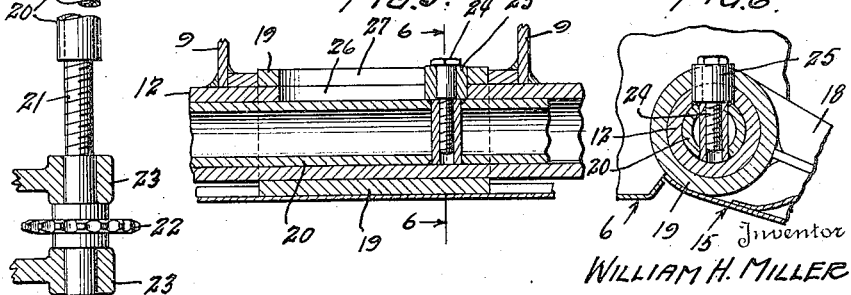 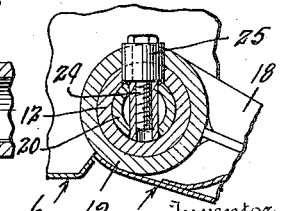
Inventor
WILLIAM H. MILLER
By Semmes, Keegin & Semmes
Attorneys

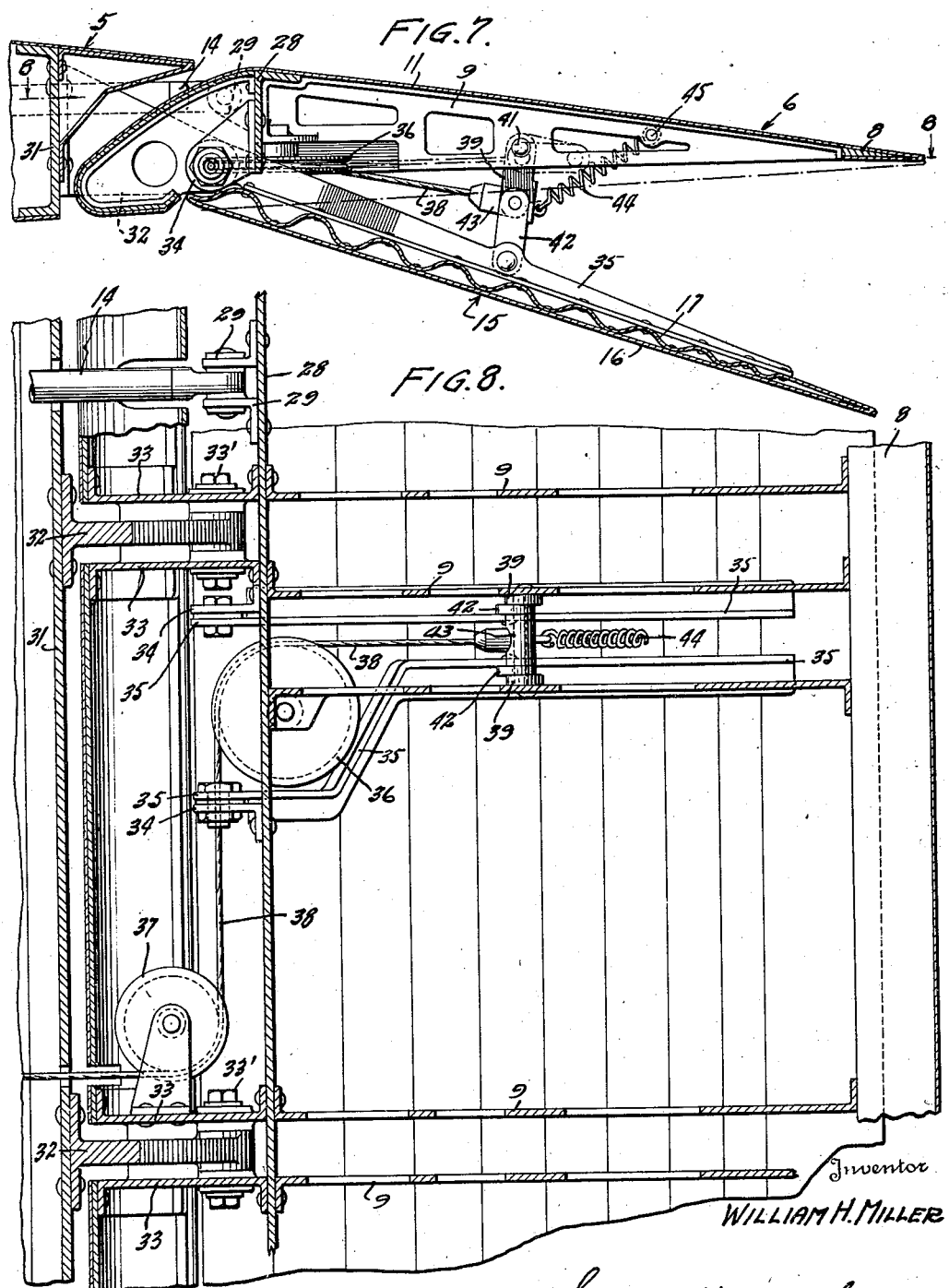

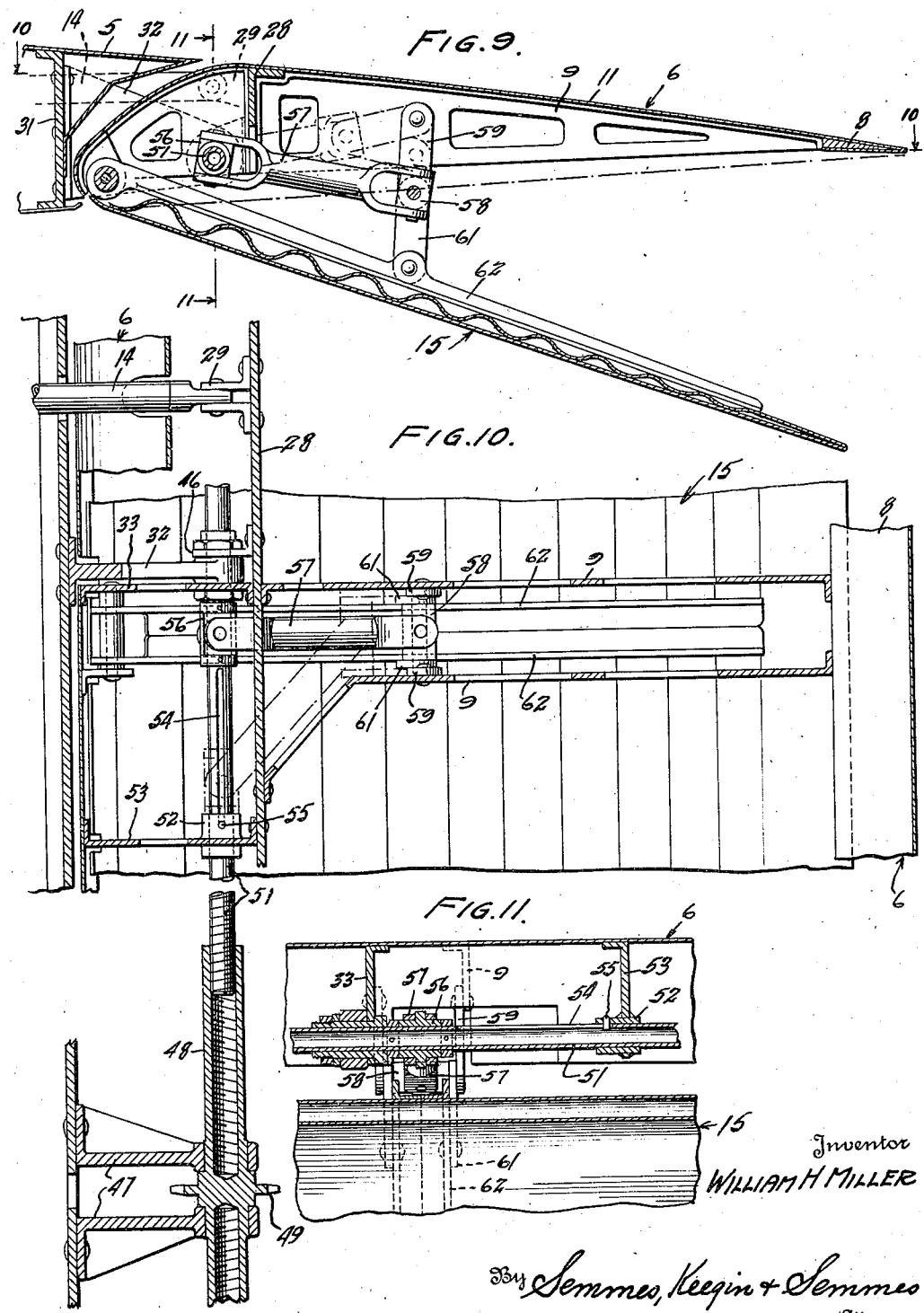

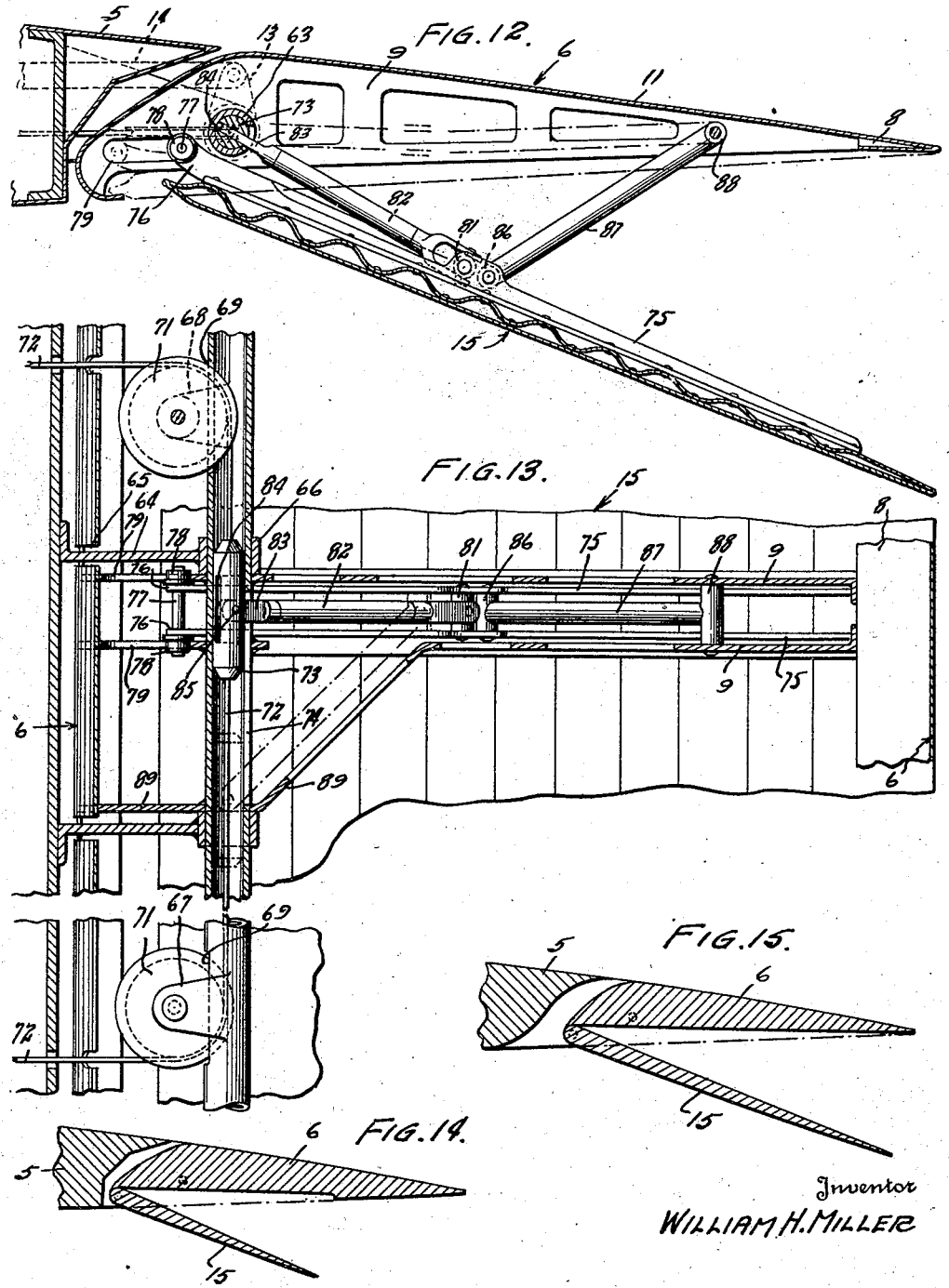

Patented Sept. 2, 1941

2,254,304

UNITED STATES PATENT OFFICE 2,254,304

AILERON AND FLAP

William H. Miller, Lansdowne, Pa., assignor to Zap Development Corporation, Baltimore, Md., a corporation of Delaware Application July 27, 1938, Serial No. 221,592

4 Claims. (Cl. 244—42)

This invention relates to airplanes, and more particularly has reference to a combination aileron and flap construction.

One of the objects of this invention is to provide a flap that extends substantially the full length of an airplane wing.

Another object of this invention is to provide a flap mounted upon the aileron of a plane.

Yet another object of this invention is to provide a combination aileron flap construction and actuating means therefor which are readily operated, light in weight, and effective in operation.

To accomplish the above, and other important objects, my invention in general embraces the concept of providing a flap which is mounted upon an aileron and extends substantially the length thereof. In the preferred form, my invention comprehends the pivoting of the flap upon the aileron and an extension of the flap to an operative position beneath the aileron.

In the accompanying drawings there are depicted several embodiments of my inventive concept, and it is to be distinctly understood that various departures may be made therefrom without avoiding the scope of my invention. In the drawings, in which corresponding numerals refer to the same parts:

Figure 1 is a top plan view of an airplane.

Figure 2 is a diagrammatic illustration of the operation of my invention with the flap in open position.

Figure 3 is a sectional view of one form of combined aileron and flap construction.

Figure 4 is a view taken along the line 4—4 of Figure 3, looking in the direction of the arrows.

Figure 5 is a view taken along the line 5—5 of Figure 3, looking in the direction of the arrows.

Figure 6 is a view taken along the line 6—6 of Figure 3, looking in the direction of the arrows.

Figure 7 is a sectional view similar to Figure 3, but showing a modified form of operating means and a modified method of mounting the flap upon the aileron.

Figure 8 is a view taken along the line 8—8 of Figure 7, looking in the direction of the arrows.

Figure 9 is a view similar to Figures 3 and 7 of a still further modified embodiment of my invention.

Figure 10 is a view taken along the line 10—10 of Figure 9, looking in the direction of the arrows.

Figure 11 is a view taken along the line 11—11 of Figure 9, looking in the direction of the arrows.

Figure 12 is a sectional view of a so-called Zap flap mounted upon an aileron.

Figure 13 is a bottom plan view of the device shown in Figure 12 with a portion of the mechanism broken away.

Figure 14 is a diagrammatic showing of an aileron and flap in accordance with my invention in which the flap extends for only a portion of the chord of the aileron.

Figure 15 is a diagrammatic showing of my invention applied to a slotted aileron.

Referring more particularly to Figure 1, there is schematically shown a plane having a fuselage 1, a stabilizer and elevator designated 2, a propeller 3, motor 4, and wings 5. Each of the wings 5 is provided with an aileron designated 6, and it will be noted that the ailerons extend substantially the length of the wings.

As best shown in Figure 3, the aileron is provided with a spar or tube 7 at its leading edge and a spar 8 at its trailing edge. Braces 9 extend from the tube 7 to the spar 8 and carry the upper surface 11 of the aileron.

A torque tube 12 extends the length of the aileron and is journalled in suitable hinge supports (not shown) extending rearwardly from the wing. The torque tube 12 is made integral with the braces 9, so that rotation of the torque tube effects a pivoting of the aileron. It will be noted that the torque tube is so positioned that there is provided a balanced aileron. A horn 13 is formed on the torque tube and there is connected to the horn a push-pull tube 14 which is suitably connected to controls operable by the pilot.

A flap designated generally 15 is hinged to the underside of the aileron, and is formed of an air surface 16 and reinforcements therefor 17. The flap 15 is carried by a plurality of flanged straps 18 spaced along the length of the flap, each strap being formed with a hinge tube 19 which serves as a sleeve fitting around the torque tube 12, to permit pivoting of the flap upon the aileron. Each hinge tube 19 is positioned between pairs of aileron ribs 9.

A tube 20 is fitted within the torque tube 12 and is longitudinally reciprocable therein. A rod 21 having its ends oppositely threaded is carried by the free ends of the slidable tubes 20. A sprocket 22 is fixedly attached intermediate the ends of the rod 21. The sprocket member 22 is likewise journalled in standards 23, and consequently rotation of the sprocket effects a reciprocation of the screw tube 20. A chain not shown is carried by the sprocket 22, which is suitably connected to a control operated by the pilot.

Reciprocation of screw tube 20 effects a pivoting of the flap 15 for, as best shown in Figures 5 and 6, the screw tube 20 carries a bolt 24, which in turn carries a roller 25. A longitudinal slot 26 is cut in the torque tube 12 to accommodate the bolt and roller. The hinge tube 19 is provided with a cam slot 27 in which the roller 25 rides. Therefore, as the screw tube 20 is reciprocated, the bolt and roller ride in the slot 27, and, inasmuch as the screw tube is splined in the torque tube 12, a rotative movement of the hinge tube is effected. The slot 27 is so generated that this rotative action effects an opening or closing of the flap.

While in Figure 4 there is shown only a single hinge tube, it will be appreciated that the necessary number of such tubes, and associated mechanisms, may be used to insure proper and safe operation of the flap.

It will be noted that when the aileron 6 is in its inoperative position, as in Fig. 3, the upper surface 11 of the aileron defines a continuation of the upper surface of wing 5 for airflow smoothly over these surfaces. The aileron is disposed rearwardly of the wing trailing portion and, in effect, provides a rear extension of the wing. The counterbalance portion of the aileron, between pivot tube 12 and spar 7, projects forwardly from tube 12 so as to underlie the trailing edge of the wing upper surface thereby advantageously nesting the counterbalance portion with respect to the wing and preserving the airflow continuity along the upper surfaces of the wing and aileron. Furthermore, when the flap 15 is raised, its under surface defines a continuation of the lower surface of the wing for smooth airflow along these surfaces. Where, as in Fig. 3, the flap pivot axis is coincident with the aileron pivot axis along tube 12 and where the aforesaid aileron counterbalance portion is employed, this counterbalance portion likewise has its undersurface disposed to preserve smooth airflow along the wing and flap undersurfaces when the flap is raised.

In Figures 7 and 8, the aileron 6 and flap 15 are of the same general construction just described, but I have provided a modified form of operating means. The aileron is provided with beam 28 which, as best shown in Figure 8, is provided with ears 29 to which is pivoted the push-pull rod 14. The rear spar 31 of the wing carries a plurality of spaced brackets 32 which fit into corresponding recesses in the leading edge of the aileron. Forward extensions 33 of ribs 9 extend from the beam 28, and bolts 33' extending through said ribs and said brackets provide means for pivoting the aileron to the wing.

The beam 28 also carries ears 34 to which are pivoted spaced angle braces 35, corresponding in general to the flanged strap 18 of the first form of device.

It will be noted that one of the angle braces 35 is offset to accommodate a sheave 36, which is rotatably mounted upon the aileron in such a position that one point on the circumference of its groove lies in the axis of pivot of both the aileron and the flap. Another sheave 37 is mounted upon the aileron and is so disposed that one point on the circumference of its groove lies within the axis of pivot of the aileron and flap. A cable 38 passes over the sheaves 36 and 37, and a portion of this cable lies within the axis of pivot. It will be noted that the cable 38 passes through one of the pivoting bolts for the flap.

One end of the cable 38 is connected to a control member operated by the pilot, and the opposite end is connected to a toggle member to operate the flap. The toggle member is made up of bifurcated arms 39, which are pivoted as at 41 to braces 9 of the aileron, while bifurcated arms 42 are pivoted to angle irons 35 on the flap. The cable 38 is connected to a joining link 43 of the toggle member, and a spring 44 is connected to such joining link and also at a point 45 on brace 9 of the aileron. It will, therefore, be seen that the spring 44 tends to urge the toggle to a folded position, in which position the flap will be closed. However, when it is desired to open the flap, the pilot may operate the controls to pull cable 38, which in turn will force the toggle member to an open position, thus lowering the flap.

It will be seen that in this form of device, as in the other embodiments, the flap may be operated regardless of the position of the aileron, and in this particular case the location of the sheaves near the axis of pivot permits the operation of the aileron without any effect upon the relative position of the flap.

In the two preceding forms of device, it will be noted that the axis of rotation of the aileron and the axis of rotation of the flap are identical. This need not necessarily be the case, and, as in Figures 9 through 11, I have provided a device in which the aileron is of the balanced type and in which the flap is pivoted at the nose of the aileron. The aileron 6 and the flap 15 are of the general types heretofore discussed. Likewise the aileron is provided with the angle iron 28 as in the preceding case, and also brackets 32 are provided on the wing. Ears 46 are mounted on the angle iron 28 and are pivotally secured to the brackets 32. This arrangement, of course, provides a balanced aileron.

The trailing edge of the wing carries a pair of brackets 47 in which is journalled an interiorally threaded tube 48. A sprocket 49 is integrally formed upon tube 48, and a chain (not shown) which passes over the sprocket is suitably connected to a control operable by the pilot. The tube 48 receives a tube 51, one end of which is exteriorally threaded to engage the interior threads of tube 48. The tube 51 passes through a collar 52 carried by a brace 53, extending from the forward edge of the aileron to angle iron 28. A slot 54 is provided in tube 51, and a pin 55 fits in collar 52 and extends into slot 54, thereby preventing rotation of tube 51, but at the same time permitting longitudinal reciprocation of the tube.

The unthreaded end of the tube 51 is provided with a block 56 to which is pivoted the bifurcated arms of a rod 57. The opposite end of the rod 57 is likewise bifurcated and fits upon a joining link 58 of a toggle mechanism. Parallel arms 59 extend from joining link 58 to braces 9 of the aileron where they are pivoted. Likewise parallel arms 61 are pivoted to braces 62 on the flap and to the joining link.

It will, therefore, be seen that upon rotation of sprocket 49 and interiorally threaded tube 48, the tube 51 will be reciprocated longitudinally, pulling with it block 56 and rod 57, and thus breaking the toggle member when the flap is open, or straightening the toggle member when the flap is closed. It will also be noted that the tubes 48 and 51 lie within the axis of pivot of the aileron, and consequently actuation of the aileron will not have any appreciable effect upon the relative position of the flap. In this connection (and the same applies to the device shown in Figures 3 through 6) while there may be a certain longitudinal movement of the tubes 51 and 21 upon actuation of the aileron, such movement is really inappreciable, inasmuch as the relative rotation of the threaded members is so very slight compared to the rotation necessary to cause any effective reciprocatory movement.

In Figures 12 and 13, there is depicted a modification of my invention adapted to a so-called Zap flap—that is, a flap which is lowered in such a way that its trailing edge, rather than describing an arc, travels in a straight line perpendicular to the aileron. Here again the aileron and flap are of the same general construction as previously described. However, the aileron 6 is provided with a tube 63, which extends the length of the aileron and is fixedly secured to the braces 9. The trailing edge of the wing is provided with rearwardly extending brackets 64, which pass through suitable recesses 65 in the forward part of the aileron, and the free ends of the brackets 64 are formed into sleeves 66. The sleeves 66 serve as journals for the tube 63, and form a pivot for the aileron. The tube 63 is provided with a pair of lugs 67 and a similar pair of lugs 68. Adjacent the lugs 67 and 68, the tube is cut away as at 69, and there is mounted upon each pair of lugs a sheave 71 which extends inwardly of the tube 63, as best shown in Figure 13.

A cable 72 passes over the sheaves 71 and is connected to a control device to be operated by the pilot. The cable 72 carries a plunger 73 which is slidable in the tube 63. The tube 63 is cut away to form a slot 74, which is coextensive with the path of travel of plunger 73.

The flap 15 is provided with a pair of spaced angle irons 75, the vertical portions of which are extended forwardly to form arms 76, which carry a bolt 77 and rollers 78. At one section in the length of the aileron, two of the braces 9 are spaced close together, and are cut away to form slots 79. In these slots 79 the rollers 78 are adapted to fit and run. Between the angle irons 75, there is rotatably fitted a rod 81. Secured to the rod 81 by universal connection is an arm 82. The opposite end of the arm 82 is tapered as at 83 and fits within a slot 84 in a plunger 73, where it is held by means of a pin 85.

A second rod 86 is rotatably mounted between angle irons 75, which rod carries an arm 87, the opposite end of which is provided with a rod 88, which in turn is rotatably mounted between the braces 9 of the aileron. It will, therefore, be seen that the flap is in effect pivoted to the aileron by means of the rod 88, its forward end being free to slide in the slots 79 of braces 9, and its trailing edge operating in a plane perpendicular to the axis of the aileron.

Actuation of the flap is, of course, effected by movement of the plunger 73 in tube 63, which shortens and lengthens the distance between tube 63 and rod 81 of the flap. Such change of distance is possible because of the fact that the flap is free to slide in slots 79. The length of the arms 82 and 87, and their positions on the aileron and flap, are such that when the flap is open its rear end descends in a line perpendicular to the trailing edge of the aileron.

It will be noted that one of the braces 9, or more particularly a portion of its vertical section, is offset as at 89 to permit of the free movement of the arm 82. It will be noted that such offset portion cooperates with the opposite brace 9 and the sleeves 66 to maintain the aileron fixed with respect to the length of the wing.

Upon operation by the pilot of the flap control mechanism, the plunger 73 will be shifted within tube 63. In Figures 12 and 13, the flap is shown in open position, and, when it is desired to close the flap, the control is operated so that plunger 73 moves downwardly in Figure 13. By such a movement, the arm 82 serves to exert an upward pull on the flap, and at the same time the flap moves forward within slots 79. When the flap is closed and it is desired to open it, plunger 73 is moved upward in Figure 13, and arm 82 consequently exerts a push against the flap which results in a dropping and rearward movement of the flap.

While the foregoing embodiments of my invention have been directed to a flap that extends the full chord of the aileron, as disclosed in Figure 15, it is, of course, obvious that my invention is adapted for a flap that extends only a portion of the chord, as shown in Figure 14. Likewise my invention may be used upon a conventional balanced aileron, as shown in Figure 14, or it may be used with a slotted aileron, as shown in Figure 15.

The advantages of my invention are believed to be apparent from the foregoing description. It will be noted that a compact arrangement of an aileron and slot is provided, and that the operating means for both the aileron and particularly the flap are positive and certain in operation. It will also be noted that the flap may be used with a balanced type of aileron, and that a minimum of air resistance is offered by the actuating mechanism.

While I have shown several preferred embodiments of my inventive concept, it is, of course, to be understood that I am not to be limited to the precise structures set forth, but that the scope of my invention is to be determined solely by the appended claims.

I claim:

1. In an airplane, a wing, an aileron, a tube fixedly mounted in the aileron, a support projecting from the trailing surface of the wing and adapted to serve as a journal for said tube, a second tube slidably mounted in said first tube and provided with means projecting through the wall of said first tube, a flap provided with a tube adapted to fit about said first-mentioned tube, and a curved slot in said flap tube adapted to receive the projecting means from the slidably mounted tube, and projecting means in cooperation with said slot serving to actuate the flap.

2. In an airplane, a wing, a torque tube rotatably mounted on the wing, an aileron fixed to the tube, means for rotating the tube to adjust the aileron about the axis of the tube, a flap pivoted on the tube for swinging movement about said axis relative to the aileron, and means for imparting swinging movement to the flap comprising a flap operator operably disposed within said tube for movement along said axis.

3. In an airplane, a wing, a torque tube rotatably mounted on the wing, an aileron fixed to the tube, means for rotating the tube to adjust the aileron about the axis of the tube, said tube having a slot extending longitudinally thereof, a flap having a hinge part journalled on the tube to accommodate swinging movement of the flap relative to the aileron, said hinge part having a cam slot, an operator disposed within the tube for reciprocation along said axis, and a roller carried by said operator in engagement with said slots such that reciprocation of said operator imparts swinging movement to the flap.

4. In an airplane, a wing, a torque tube rotatably mounted on the wing, an aileron fixed to the tube, means for rotating the tube to adjust the aileron about the axis of the tube, a flap pivoted on the tube for swinging movement about said axis relative to the aileron, said flap having a cam, and operating means extending through the tube in the direction of said axis for actuating said cam to impart swinging movement to the flap.

WILLIAM H. MILLER.